(12) United States Patent
Penton et al.

(10) Patent No.: US 8,484,508 B2
(45) Date of Patent: Jul. 9, 2013

(54) DATA PROCESSING APPARATUS AND METHOD FOR PROVIDING FAULT TOLERANCE WHEN EXECUTING A SEQUENCE OF DATA PROCESSING OPERATIONS

(75) Inventors: Antony John Penton, Cambridge (GB);
Simon Andrew Ford, Cambridge (GB);
Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 712 days.

(21) Appl. No.: 12/656,068

(22) Filed: Jan. 14, 2010

(65) Prior Publication Data

US 2011/0173482 A1    Jul. 14, 2011

(51) Int. Cl.
*G06F 11/00* (2006.01)

(52) U.S. Cl.
USPC .................................. 714/10; 714/2; 714/25

(58) Field of Classification Search
USPC ...................................................... 714/10, 11
See application file for complete search history.

(56) References Cited

U.S. PATENT DOCUMENTS

| | | | |
|---|---|---|---|
| 2002/0026604 A1* | 2/2002 | Bissett et al. .................... | 714/12 |
| 2009/0183035 A1* | 7/2009 | Butler et al. .................... | 714/48 |

OTHER PUBLICATIONS

Baleani et al., "Fault-Tolerant Platforms for Automotive Safety-Critical Application", Cases'03, Oct. 30-Nov. 1, 2003, San Jose, CA, U.S., pp. 170-177.
Weaver et al., "A Fault Tolerant Approach to Microprocessor Design", Appears in Dependable Systems and networks (DSN), Jul. 2001, 10 pages.
Austin, "DIVA: A Reliable Substrate for Deep Submicron Microarchitecture Design", 1999, Advanced Computer Architecture Laboratory University of Michigan, pp. 196-207.

* cited by examiner

*Primary Examiner* — Scott Baderman
*Assistant Examiner* — Sarai Butler
(74) *Attorney, Agent, or Firm* — Nixon & Vanderhye (57) ABSTRACT

A data processing apparatus and method provide fault tolerance when executing a sequence of data processing operations. The data processing apparatus has processing circuitry for performing the sequence of data processing operations, and a redundant copy of that processing circuitry for operating in parallel with the processing circuitry, and for performing the same sequence of data processing operations. Error detection circuitry detects an error condition when output data generated by the processing circuitry differs from corresponding output data generated by the redundant copy. Shared prediction circuitry generates predicted data input to both the processing circuitry and the redundant copy, with the processing circuitry and redundant copy then performing speculative processing of one or more data processing operations in dependence on that predicted data. Each of the processing circuitry and the redundant copy include checking circuitry for determining whether the speculative processing was correct, and initiating corrective action if the speculative processing was not correct. By sharing the prediction circuitry rather than replicating it within both the processing circuitry and the redundant copy, significant area and power consumption benefits can be achieved without affecting the ability of the apparatus to detect faults.

13 Claims, 6 Drawing Sheets

DATA PROCESSING APPARATUS AND METHOD FOR PROVIDING FAULT TOLERANCE WHEN EXECUTING A SEQUENCE OF DATA PROCESSING OPERATIONS

BACKGROUND OF THE INVENTION

1. Field of the Invention

The present invention relates to a data processing apparatus and method for providing fault tolerance when executing a sequence of data processing operations.

2. Description of the Prior Art

Many applications for modern data processing systems require mechanisms to be put in place to detect occurrences of faults. For example, many safety critical applications require data processing systems with in-built fault tolerance to ensure any errors in operation are quickly detected. Within a data processing system, both permanent and transient faults may occur. For example, as systems become smaller and smaller, the reduced pitch and wire width can significantly increase the probability of occurrence of an undesired short or open circuit, causing a permanent fault in a system.

Similarly, transient faults, also called single event upsets (SEUs), may occur due to electrical noise or external radiation. Radiation can, directly or indirectly, induce localised ionisation events capable of upsetting internal data states. While the upset causes a data error, the circuit itself is undamaged and the system experiences a transient fault. The data upsetting is called a soft error, and detection of soft errors is of significant concern in safety critical applications.

A data processing system will typically comprise processing circuitry for performing a sequence of data processing operations, and one or more storage structures used to store data manipulated by the data processing circuitry during the execution of those data processing operations. One known technique for providing fault tolerance against permanent or transient errors is to employ redundancy within the data processing system, as for example illustrated schematically in FIG. 1.

Figure 1:
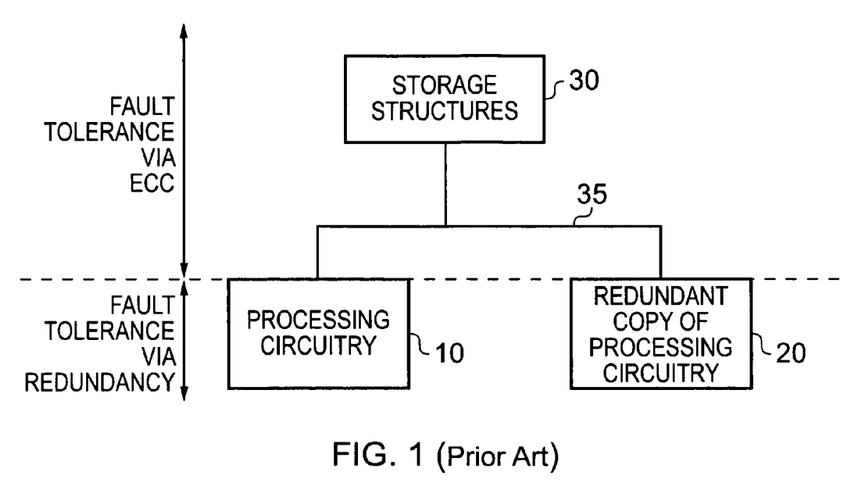
FIG. 1 is a block diagram schematically illustrating a known data processing apparatus employing redundancy as a mechanism for fault tolerance.

As shown, in addition to the processing circuitry 10, a redundant copy of the processing circuitry 20 is provided. Both the processing circuitry 10 and the redundant copy 20 execute the same code, and accordingly perform the same sequence of data processing operations. One way of operating such a data processing apparatus is in a lock-step architecture, as for example described in the article "Fault-Tolerant Platforms for Automotive Safety-Critical Applications" by M Baleani et al, Proceedings of the 2003 International Conference on Compilers, Architecture and Synthesis for Embedded Systems, Oct. 30 to Nov. 1, 2003, San Jose, Calif., Pages 170 to 177. In accordance with a lock-step architecture, both the processing circuitry 10 and the redundant copy 20 execute the same code and are strictly synchronised so as to execute the code at the same rate, with or without a fixed timing offset. The processing circuitry 10 (often referred to as the master) has access to the system memory and drives all system outputs, whilst the redundant copy 20 (also referred to as the checker) continuously executes the same instructions as the master, with the outputs produced by the checker being input to comparison logic that checks for consistency between the outputs from the master and the outputs from the checker. When these outputs do not match, this reveals the presence of a fault in either the processing circuitry 10 or the redundant copy 20, thereby alerting the system to the presence of a fault.

Such comparison circuitry does not detect bus and memory errors, which can in fact be a source of common-mode failure causing both the processing circuitry 10 and the redundant copy 20 to fail the same way. Accordingly, as shown in FIG. 1, the bus 35 and storage structures 30 (such as the memory) can be protected against faults by deploying error detection (correction) techniques such as error correcting codes (ECCs).

The benefits of the redundant circuitry approach such as described in FIG. 1 are that it provides robust fault tolerance, is simple to build (in that the redundant copy 20 is merely a complete replica of the processing circuitry 10), and the fault detection has no speed impact on the operation of the processing circuitry 10. However, one disadvantage of such an approach is that it requires a relatively large area (due to the need for the redundant copy 20), and is costly in terms of power consumption, due to the operation of the redundant copy 20. Issues can also arise with regard to the timing requirements to keep the processing circuitry 10 and the redundant copy in lock-step.

An alternative approach to fault tolerance is described in the articles "A Fault Tolerant Approach to Microprocessor Design" by C Weaver et al, Dependable Systems and Networks (DSN), July 2001, and "DIVA: A Reliable Substrate for Deep Submicron Microarchitecture Design" by T Austin, University of Michigan, appearing in MICRO 32: Proceedings of the 32nd annual ACM/IEEE international symposium on Microarchitecture, 1999, pages 196 to 207, Haifa, Israel. In particular, both of these papers describe a testing approach called dynamic verification, where a checking mechanism is inserted into the retirement stage of a complex microprocessor. In accordance with the described approach, a core processor employing a high degree of speculative execution executes a sequence of instructions, and when those instructions have been completed, their input operands and results are sent in program order to the checking mechanism, referred to therein as a checker processor. The checker processor follows the core processor, verifying the activities of the core processor by re-executing all program computations in its wake. However, the high-quality stream of predictions from the core processor serves to simplify the design of the checker processor and speed its processing. In particular, the checker processor can perform many of the operations in parallel, since by the time the checker processor re-executes all of the program computations performed by the core processor, all processing hazards have been eliminated and hence the checking process can execute without speculation.

When compared with the earlier-described approach using replicated processing circuitry executing in lock-step with the main processing circuitry, such an approach can result in a smaller area and reduced power consumption, due to the reduction in complexity of the checker processor. Further, since the design of the checker processor is entirely different to that of the core processor, there is the potential for detecting additional faults that might not be spotted by pure replicated processors. In addition, some of the timing complexities can be reduced due to the checker processor's operation following that of the core processor. However, designing such a core processor and associated checker processor is a complex task, due to the need to separately design the checker processor in addition to the core processor, which will preclude the use of such an approach in many applications.

Another known approach is the reduced-area, redundant CPU system (fault-robust (fR) CPU) produced by Yogitech, where the fault distribution and effects are analysed within a CPU, and then a checker CPU is produced which is customised for the particular application and which generates and compares the results required for high fault coverage. As with the earlier-described dynamic verification approach, the resulting system may be more optimal in area and power consumption terms than a pure replicated CPU approach, but requires significant work to analyse the fault distribution and effects of the CPU and to design the resultant checker CPU.

It would be desirable to develop a fault tolerant system which retained the simplicity of utilising the redundant copy of processing circuitry to provide fault tolerance, but which provided reduced area and power consumption when compared with known redundant copy techniques.

SUMMARY OF THE INVENTION

Viewed from a first aspect, the present invention provides a data processing apparatus, comprising: processing circuitry for performing a sequence of data processing operations; a redundant copy of said processing circuitry for operating in parallel with said processing circuitry to perform said sequence of data processing operations; error detection circuitry for detecting an error condition when output data generated by said processing circuitry differs from corresponding output data generated by said redundant copy; and shared prediction circuitry for generating predicted data input to both the processing circuitry and the redundant copy, the processing circuitry and redundant copy arranged to perform speculative processing of one or more of the data processing operations in said sequence in dependence on said predicted data; each of the processing circuitry and said redundant copy including checking circuitry for determining whether the speculative processing was correct, and initiating corrective action if the speculative processing was not correct.

In accordance with the present invention, shared prediction circuitry is provided which is utilised by both the processing circuitry and the redundant copy of the processing circuitry, thereby avoiding the need to replicate the prediction circuitry within the processing circuitry and redundant copy, thereby reducing area and power consumption. Since only a single prediction circuitry is utilised, no fault protection is provided in respect of the prediction circuitry's operation, but the inventors of the present invention realised that the operation of the prediction circuitry was inherently safe, and accordingly the lack of fault protection in respect of the operation of the prediction circuitry would not affect the overall fault tolerance capabilities of the data processing apparatus.

In particular, the shared prediction circuitry generates predicted data, with both the processing circuitry and the redundant copy then performing speculative processing of one or more data processing operations in dependence on that predicted data. However, as both the processing circuitry and the redundant copy already include checking circuitry for determining whether the speculative processing was correct, protection against faults occurring during operation of the prediction circuitry is effectively provided, without needing to replicate the prediction circuitry.

By adopting such an approach, significant area and power consumption savings can be realised within the data processing apparatus, whilst enabling the design simplicity of using a redundant copy which is a pure replica of the processing circuitry to be retained.

There are a number of ways in which the checking circuitry could determine whether the speculative processing was correct. However, in one embodiment, the processing circuitry and the redundant copy are arranged to generate computed data during performance of said sequence of processing operations, and the checking circuitry compares the predicted data with corresponding computed data in order to determine whether the speculative processing was correct.

The shared prediction circuitry can take a variety of forms. However, in one embodiment, the shared prediction circuitry is branch prediction circuitry for generating as said prediction data at least an indication of a next instruction to be executed following a branch instruction. In many modern data processing systems, the branch prediction circuitry is relatively large, and accordingly significant benefits in terms of area and power consumption can be realised by sharing, rather than replicating, the branch prediction circuitry.

The prediction data produced by the branch prediction circuitry can take a variety of forms, but in one embodiment comprises at least one of: an indication of whether a branch specified by the branch instruction is predicted to be taken or not taken; an address of the next instruction; or the next instruction. Irrespective of how the branch prediction circuitry is constructed, it can be shared using the technique of embodiments of the present invention, due to the presence of the checking circuitry in both the processing circuitry and the redundant copy, thereby ensuring that the operation of the shared prediction circuitry is inherently safe and any faults will not cause incorrect operation of the apparatus.

In an alternative embodiment, the shared prediction circuitry is data access prediction circuitry for generating as said prediction data a data address indication for identifying data to be fetched into the processing circuitry and the redundant copy. Such data may be fetched into registers within the processing circuitry and redundant copy, or directly into the execution units of the processing circuitry and redundant copy. Particularly when employing pipelined processing circuitry, there may be insufficient time in a particular clock cycle to generate and decode an address in order to unambiguously identify the location and address of the data to be fetched into the processing circuitry. However, it may be possible during that stage to provide sufficient information to enable data access prediction circuitry to predict the data address and location that needs to be accessed, with the data then being fetched dependent on that prediction. In situations where the prediction accuracy is relatively high, this can significantly increase the speed of the data processing circuitry. Again, since both the processing circuitry and the redundant copy will already include checking circuitry for checking in due course whether any such predicted data address matches the actual computed data address (and correcting if necessary), the operation of the data access prediction circuitry is inherently failsafe, and hence the data access prediction circuitry can be shared rather than replicated within both the processing circuitry and the redundant copy, thereby enabling space and power consumption savings to be realised.

In one particular embodiment, the data address is formed by reading a base address from one register and summing it with an offset which is either encoded in the instruction or read from another register. The address then determines which RAM is to be accessed (the "side" or "chip-select"), but there is not enough time in the issue stage to perform the read-sum-decode sequence. In such an embodiment, the data access prediction circuitry may be arranged to predict the side from the base address only, on the assumption that the offset is small compared to the size of the targeted RAM.

There are various ways in which the shared prediction circuitry can be stimulated to generate the predicted data. However, in one embodiment the shared prediction circuitry is responsive to stimulus data from said processing circuitry to generate said predicted data in dependence on said stimulus data and to issue said predicted data to both the processing circuitry and the redundant copy.

In such an embodiment, the corresponding stimulus data produced by the redundant copy is not utilised by the shared prediction circuitry, and indeed in one embodiment that corresponding stimulus data can merely be ignored. However, in an alternative embodiment, the error detection circuitry is further arranged to compare said stimulus data with corresponding stimulus data from said redundant copy, and to detect said error condition when said stimulus data and said corresponding stimulus data do not match. By such an approach, the detection of an error can be detected earlier than would be the case if the stimulus data was used unchecked by the shared prediction circuitry. However, whether the stimulus data is checked or not, the operation of the shared prediction circuitry is inherently failsafe for the reasons discussed earlier.

There are a number of ways in which the processing circuitry and the redundant copy can be arranged to perform the sequence of data processing operations. In one embodiment, the processing circuitry and redundant copy perform said sequence of data processing operations at the same processing rate. In one embodiment, both the processing circuitry and the redundant copy perform exactly the same computation in each clock cycle, but in an alternative embodiment, the redundant copy performs said sequence of processing operations with a fixed timing offset relative to said processing circuitry. Hence, in such an embodiment, the operation of the redundant copy can be delayed by a number of clock cycles relative to the processing circuitry, in one particular embodiment the redundant copy being delayed by two clock cycles relative to the processing circuitry.

By using such a timing offset, temporal diversity is provided. Without it, faults that may occur (particularly in clock generation or power supply) could affect both copies of the logic in the same way and therefore go undetected by the comparators. With the offset, such a fault occurring at a given physical time will affect the two copies of the logic at different logical/program times, and is therefore much more likely to produce a comparison error.

In one embodiment, both the processing circuitry and the redundant copy comprise a plurality of pipeline stages, and the error detection circuitry is arranged to receive output data from at least one pipeline stage of the processing circuitry and corresponding output data from the corresponding at least one pipeline stage of the redundant copy.

Which items of output data are subjected to error detection can be varied dependent on implementation. However, in one embodiment, the error detection circuitry is arranged to receive output data from multiple pipeline stages of the processing circuitry and corresponding output data from the corresponding multiple pipeline stages of the redundant copy, so as to detect said error condition in any of at least the address values and data values output by the processing circuitry and the redundant copy. Hence, in such embodiments, all primary outputs of the processing circuitry are checked for correspondence with the corresponding outputs from the redundant copy, thereby providing robust fault tolerance.

Viewed from a second aspect, the present invention provides a method of providing fault tolerance within a data processing apparatus comprising processing circuitry for performing a sequence of data processing operations, and a redundant copy of said processing circuitry for operating in parallel with said processing circuitry to perform said sequence of data processing operations, the method comprising the steps of: employing shared prediction circuitry to generate predicted data input to both the processing circuitry and the redundant copy; within each of the processing circuitry and the redundant copy, performing speculative processing of one or more of the data processing operations in said sequence in dependence on said predicted data; within each of the processing circuitry and said redundant copy, performing one or more checking operations to determine whether the speculative processing was correct, and initiating corrective action if the speculative processing was not correct; and detecting an error condition when output data generated by said processing circuitry differs from corresponding output data generated by said redundant copy.

Viewed from a third aspect, the present invention provides a data processing apparatus, comprising: processing means for performing a sequence of data processing operations; redundant means providing a redundant copy of said processing means for operating in parallel with said processing means to perform said sequence of data processing operations; error detection means for detecting an error condition when output data generated by said processing means differs from corresponding output data generated by said redundant means; and shared prediction means for generating predicted data input to both the processing means and the redundant means, the processing means and redundant means for performing speculative processing of one or more of the data processing operations in said sequence in dependence on said predicted data; each of the processing means and said redundant means including checking means for determining whether the speculative processing was correct, and initiating corrective action if the speculative processing was not correct.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 2:
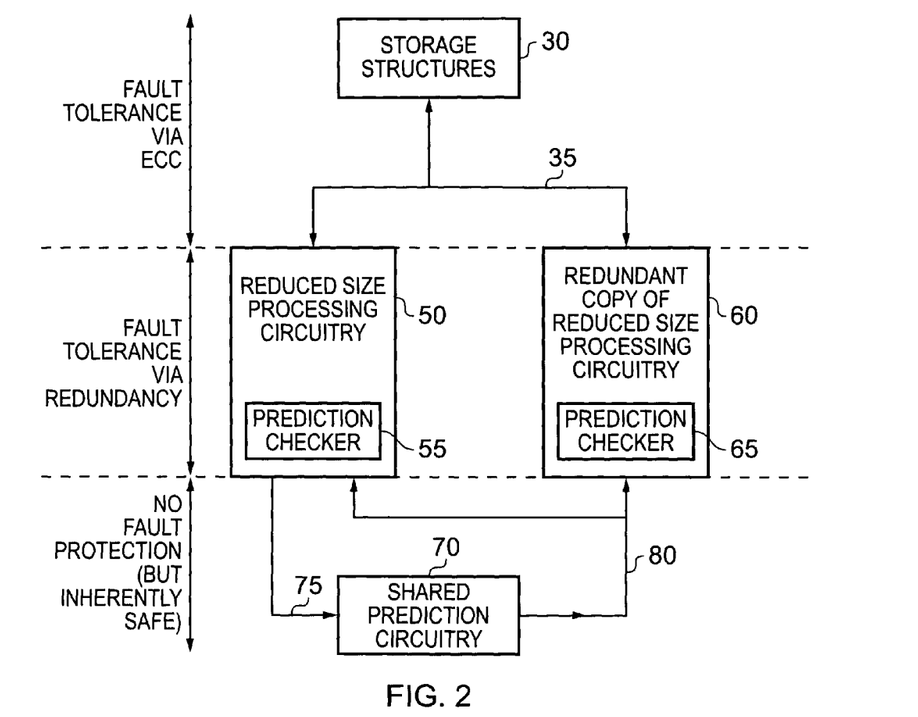
FIG. 2 is a block diagram schematically illustrating a data processing apparatus in accordance with one embodiment.

FIG. 2 is a block diagram schematically illustrating a data processing apparatus in accordance with one embodiment. As shown, a reduced size processing circuit 50 is provided, along with a redundant copy of that reduced size processing circuit 60. The processing circuitry 50 is of reduced size when compared with the equivalent prior art processing circuitry 10 of FIG. 1, since it no longer includes one or more prediction circuits. Similarly, because the redundant copy 60 is an exact replica of the processing circuitry 50, it also is of reduced size relative to the redundant copy 20 of FIG. 1, in that it also omits such prediction circuitry. Instead, shared prediction circuitry 70 is provided which outputs predicted data to both the reduced size processing circuitry 50 and the redundant copy 60.

As shown in FIG. 2, stimulus data output by the reduced size processing circuitry 50 over path 75 is used by the shared prediction circuitry 70 to generate predicted data which is then output over path 80 to both the processing circuit 50 and the redundant copy 60. Whereas the presence of the redundant copy 60 provides fault tolerance in respect of the operation of the processing circuit 50, no protection against faults is provided in respect of the shared prediction circuitry 70. However, the inventors of the present invention realised that no such fault protection was necessary, since the operation of the shared prediction circuitry 70 is inherently safe.

In particular, the predicted data generated by the shared prediction circuitry influences speculative processing of one or more data processing operations performed by the processing circuitry 50, the same speculative operations also being performed by the redundant copy 60. In processing circuits where such speculative processing is performed, prediction checking circuits will be provided to confirm in due course whether the speculative processing was correct. For example, if the shared prediction circuitry is branch prediction circuitry, and the prediction data provides an indication of a next instruction to be executed following a branch instruction, the processing circuitry will continue its operation on a speculative basis using that prediction data. However, in due course, it will determine whether the next instruction that was to be executed following the branch instruction was in fact that indicated by the prediction data. If it was, no further action is required, whereas if it was not, it will typically be necessary to flush a number of operations from the processing circuitry and to restart execution from the correct next instruction after the branch instruction. Since such prediction checking circuitry 55 is already provided within the processing circuitry 50 (and identical prediction checking circuitry 65 is also provided within the redundant copy 60), the operation of the shared prediction circuitry 70 is inherently safe and does not require any fault protection. To the extent it produces prediction data which is incorrect, whatever the reason for the generation of that incorrect prediction data, this will be identified in due course by the prediction checker and corrective action will be taken.

Often the prediction circuitry used within modern processing circuits is of a significant size, and accordingly the ability to provide shared prediction circuitry, as opposed to replicating the prediction circuitry within both the processing circuit 50 and the redundant copy 60, can significantly reduce the size and power consumption of the processing circuit 50 and redundant copy 60, thereby yielding significant benefits.

As with the main example of FIG. 1, both the processing circuit 50 and redundant copy 60 can access one or more storage structures (such as shared memory) 30 via a bus network 35, and the storage structures 30 and associated bus network 35 can be protected against faults via the use of appropriate error detection (correction) techniques such as error correcting codes (ECCs).

Figure 3:
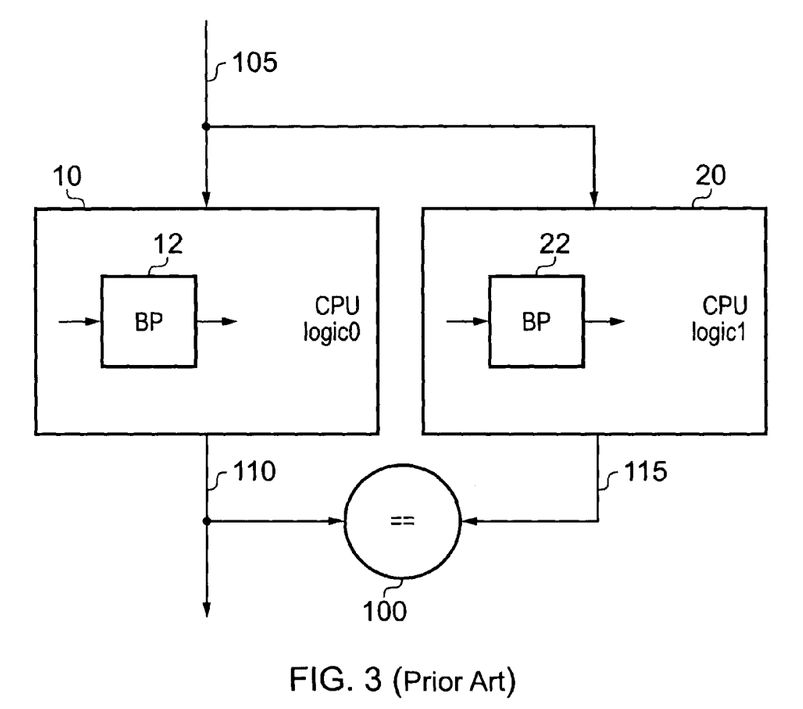
FIG. 3 schematically illustrates the replication of branch prediction units within a known replicated CPU system.

The shred prediction circuitry 70 can take a variety of forms. For example, it may take the form of data address prediction circuitry for predicting the address of data values required by the processing circuitry to allow earlier fetching of those data values from cache or main memory. However, in one embodiment the shared prediction circuitry 70 takes the form of shared branch prediction circuitry for predicting the next instruction to be executed after a branch instruction. FIG. 3 illustrates the provision of branch prediction circuits 12, 22 within both the processing circuit 10 and redundant copy 20 of the known prior art system of FIG. 1. Input data is passed over path 105 to both the processing circuit 10 and the redundant copy 20, which in this example take the form of a central processing unit (CPU). The output data produced by the processing circuit 10 over path 110 is compared with the corresponding output data produced by the redundant copy 20 over path 115 through use of comparison circuitry 100, with any difference in those output values being used to trigger an error condition. Whilst the error signal will not indicate whether the error occurred in the processing circuit 10 or the redundant copy 20, such a mechanism provides a very reliable mechanism for detecting the occurrence of errors, which can be particularly useful in safety critical applications.

The branch prediction circuitry 12 is typically relatively large, and consumes significant power during operation. Since the redundant copy 20 is an exact replica of the processing circuit 10, the redundant copy of the branch prediction circuit 22 is also large and consumes significant power.

Figure 4:
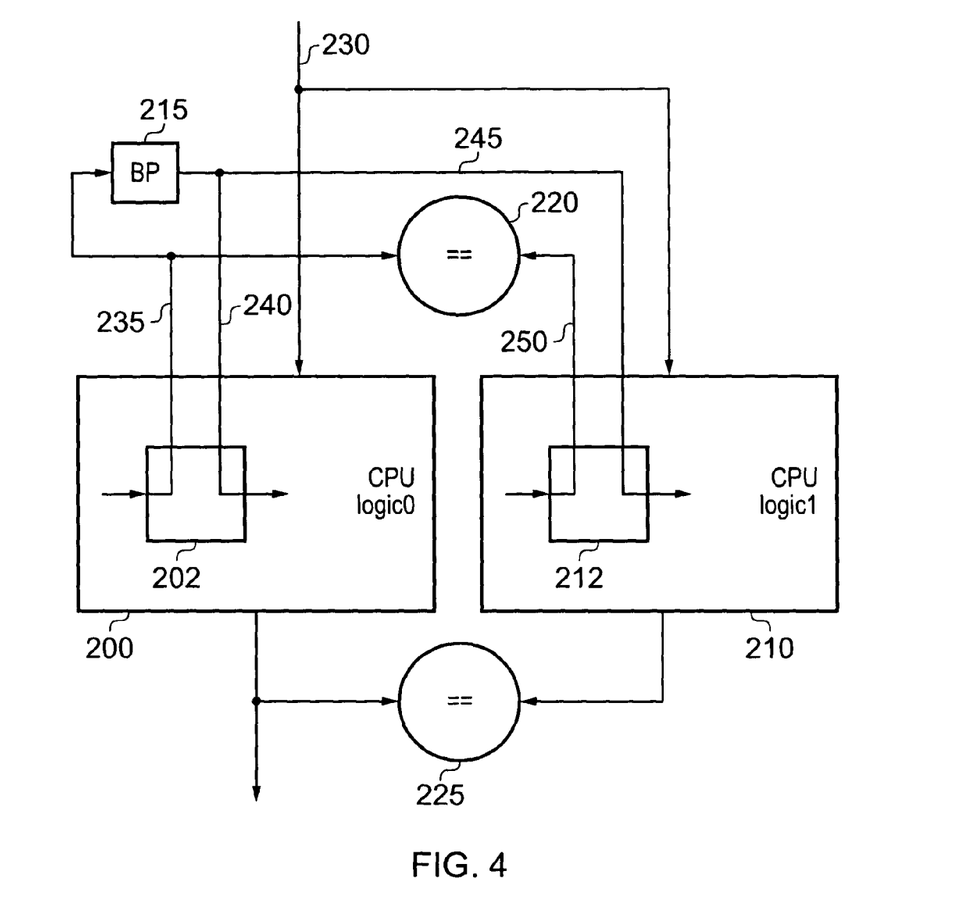
FIG. 4 illustrates a data processing apparatus in accordance with one embodiment, where shared branch prediction circuitry is utilised by a master processing circuit and redundant copy of that processing circuit.

FIG. 4 illustrates how the branch prediction circuitry can be shared in accordance with one embodiment to provide significant reduction in size and power consumption. In this example, the processing circuit 200 in the form of a CPU is provided, but with the branch prediction circuitry omitted (as indicated by the box 202). Since the redundant copy 210 is an exact replica of the processing circuit 200, it also omits the branch prediction circuitry, as indicated by the box 212 in FIG. 4. As with the prior art configuration of FIG. 3, input data is provided over path 230 to both the processing circuit 200 and the redundant copy 210, and comparison circuitry 225 compares the outputs from both the processing circuit 200 and the redundant copy 210 in order to detect the presence of errors.

The prediction stimulus data that would normally have been routed internally within the CPU 200 to the branch prediction circuit, is now routed over path 235 to the shared branch prediction circuitry 215, the shared branch prediction circuitry generating prediction data which is then forwarded over paths 240 and 245 to the processing circuitry 200 and redundant copy 210, respectively, for use in speculative execution of one or more further data processing operations within the processing circuit 200 and the redundant copy 210.

In one embodiment, the corresponding stimulus data generated by the redundant copy 210 can be ignored. However, in an alternative embodiment, such corresponding stimulus data is routed over path 250 to comparison circuitry 220, which compares that corresponding stimulus data with the actual stimulus data output by the processing circuit 200 over path 235. The use of such comparison circuitry 220 can detect the presence of an error more quickly than if the comparison circuitry 220 is omitted. However, irrespective of whether the comparison circuit 220 is or is not provided, the operation of the branch prediction circuit 215 is failsafe. Any error in the stimulus data 235 will typically cause an error in the prediction data output by the branch prediction circuitry 215 over path 245, and in due course that error will be noted by the prediction checking circuitry 55, 65 within the processing circuit and redundant copy, resulting in re-performance of the affected operations.

Typically the CPU 200 will comprise a plurality of pipeline stages, and output data may be output from one or more of those pipeline stages. The same will also be true for the redundant copy 210. The comparison logic 225 may be arranged to compare one or more of those items of output data produced by both the processing circuitry 200 and the redundant copy 210. In one particular embodiment, the comparison circuitry 225 is arranged to check all primary outputs of the processing circuitry for correspondence with the corresponding outputs from the redundant copy 210, in order that all address values and data values output by the processing circuit are checked for consistency with the corresponding outputs from the redundant copy 210. In addition to checking the actual address values, any associated control values can also be checked.

In embodiments of the present invention, the redundant copy 210 is arranged to operate in parallel with the processing circuit 200 in order to perform exactly the same sequence of data processing operations as are performed within the processing circuit 210. Typically, both the processing circuit 200 and the redundant copy 210 will be arranged to operate at the same processing rate. Since the redundant copy is an exact replica of the processing circuit, this is typically achieved by operating the redundant circuit 210 at the same clock speed as the processing circuit 200 and tying the inputs of both circuits to the same signal line. Both the processing circuit 200 and the redundant copy 210 may be arranged in any particular clock cycle to perform exactly the same operation, or in an alternative embodiment, the redundant copy 210 may be arranged to perform the sequence of processing operations with a fixed timing offset relative to the processing circuitry 200. In one particular embodiment, the redundant copy 210 is delayed by two clock cycles relative to the processing circuitry 200.

Figure 5:
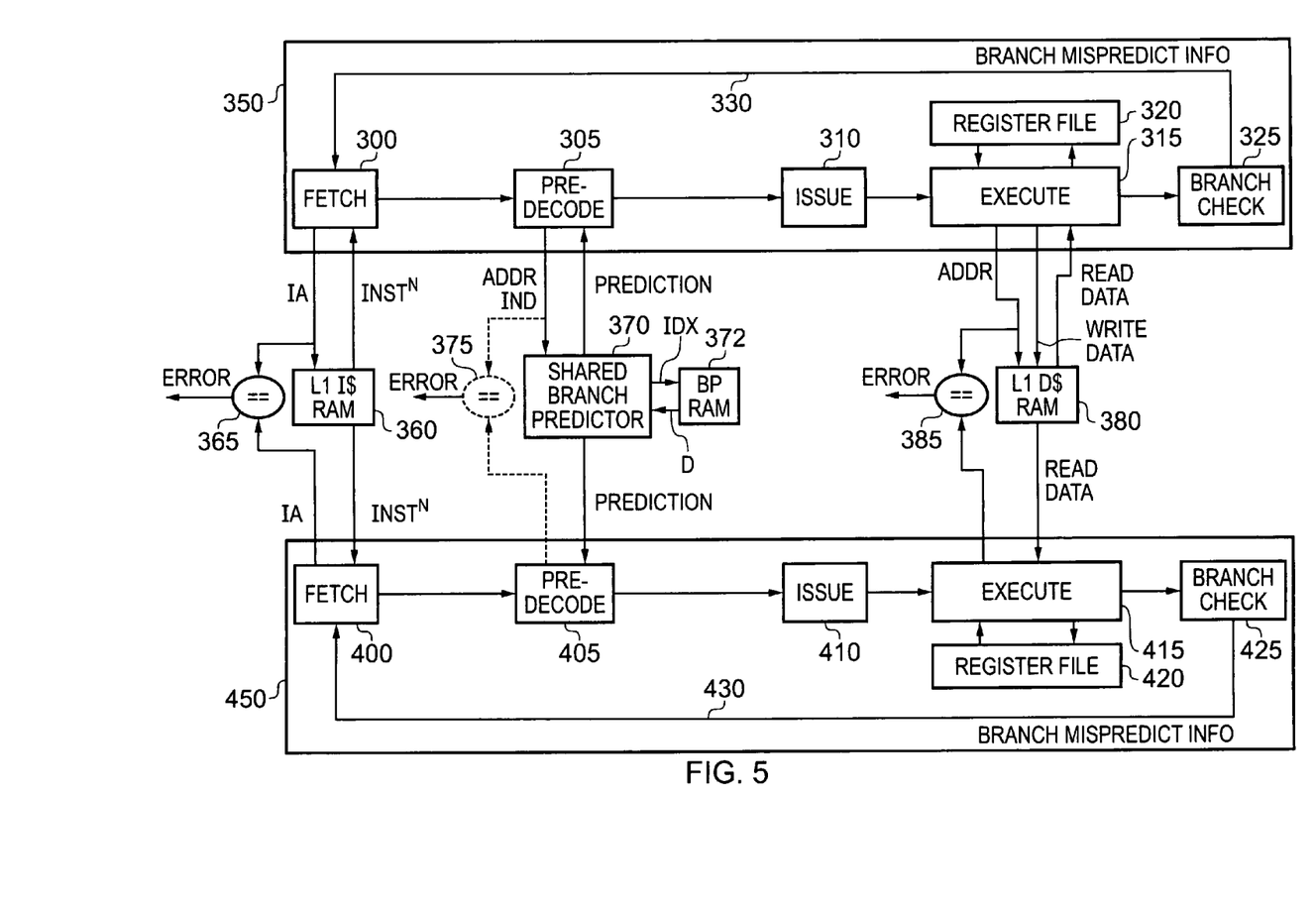
FIG. 5 is a block diagram of a data processing apparatus in accordance with one embodiment.

FIG. 5 is a block diagram of a data processing apparatus in accordance with one embodiment. Processing circuitry 350 is provided in the form of a pipelined CPU. A number of pipeline stages are schematically illustrated in FIG. 5, in particular a fetch stage 300 where instructions are fetched from cache and/or main memory for execution by the processing circuitry 350, a pre-decode stage 305 where some initial decoding of instructions is performed, and an issue stage 310 where the instructions are fully decoded and then issued to the appropriate execute path within an execute stage 315. The execute stage 315 may in practice provide a plurality of parallel paths for performing different types of operations, for example an ALU path for performing arithmetic logic operations, a floating point path for performing floating point computations, a load/store path for loading data from cache/memory and for storing data back to cache/memory, etc. Further, the execute stage 315 will typically comprise multiple pipeline stages, with the required operations being performed over several clock cycles. As shown schematically in FIG. 5, the execute stage 315 has access to a register file 320 from which input operands can be read during the early part of the execute stage, and to which results can be written towards the end of the execute stage.

As also shown in FIG. 5, a branch checking stage 325 is provided. Whilst this is shown separately to the execute stage 315 for ease of illustration, it is typically the case that such branch checking functions are performed towards the end of the execute stage, and hence in some embodiments the branch checking stage 325 can be considered to be incorporated within the execute stage. The purpose of branch check circuitry within the branch checking stage 325 is to evaluate whether any branch prediction data used to speculatively perform some operations within the execute stage 315 was correct, and hence whether those speculative operations were the correct operations to perform. In particular, at the pre-decode stage 305, address indication data may be forwarded from the pre-decode circuitry to the branch predictor circuitry 370, with the branch predictor circuitry 370 then returning as prediction data an indication of a next instruction to be executed following a branch instruction, with one or more subsequent operations being performed in dependence on that prediction data.

Often branch prediction circuitry will have access to one or more storage structures that are referenced based on the address indication in order to generate the prediction data returned to the pre-decode circuitry. For example, often a branch history buffer (BHB) is used to store summary information about the direction a branch took the last few times it was executed, and this information is used to predict whether a branch will be taken or not taken. Further, for a branch instruction which is predicted to be taken, the fetch unit then needs to determine the next instruction to be fetched. For direct branch instructions, this can be derived directly from the branch instruction, for example the branch instruction encoding containing the offset amount between the instruction and the address to be branched to if the branch is taken. However, in other situations, a branch target buffer (BTB) may be maintained and referenced by the prediction circuitry in order to seek to identify the target address for the branch instruction. Further, in some embodiments, it may be possible to construct a storage structure which directly stores the next instruction to be executed for particular branch instructions, with that actual instruction being returned as prediction data rather than merely the address of the next instruction.

In FIG. 5, these various types of storage structures referenced by the branch predictor are schematically illustrated by the branch prediction RAM 372. Irrespective of whether the branch predictor 370 is used to return a taken/not taken indication, an address of the next instruction for a taken branch, or the instruction itself to be executed following a taken branch, then the branch predictor 370 will generally use the address indication to generate an index into the branch prediction RAM 372, with data then being returned from the branch prediction RAM 372 that is used by the branch predictor 370 to generate the prediction data returned to the pre-decode circuitry 305.

Execution will then continue within the processor 350 based on the prediction provided by the branch predictor 370, with the branch checking circuitry in the branch check stage 325 subsequently determining whether the next instruction to be executed following the branch instruction was in fact the instruction predicted by the branch predictor 370. If it was, no further action is required, but if it was not, it will typically be necessary to flush the pipeline and re-execute one or more data processing operations starting with the correct instruction that should have followed the branch instruction. Accordingly, as shown schematically in FIG. 5, branch mispredict information can be returned over path 330 to the fetch stage 300 to cause the correct sequence of instructions to be fetched following a branch misprediction.

As shown in FIG. 5, a redundant copy 450 of the processing circuitry 350 is provided, which is a complete replica of the processing circuitry 350. Accordingly, the fetch stage 400, pre-decode stage 405, issue stage 410, execute stage 415 and branch check stage 425 correspond directly with the fetch stage 300, pre-decode stage 305, issue stage 310, execute stage 315 and branch check stage 325 of the processing circuitry 350. Further, the register file 420 corresponds with the register file 320. The redundant copy executes the same sequence of processing operations as are executed by the processing circuitry 350. Further, the branch predictor 370 is shared by the processing circuitry 350 and the redundant copy 450, and any prediction data returned to the processing circuitry 350 based on the address indication stimulus output by the pre-decode stage 305 is also provided to the pre-decode stage 405 within the redundant copy 450.

As discussed earlier with reference to FIG. 4, comparison circuitry 375 may be provided for comparing the address indication provided by the pre-decode stage 305 with the corresponding address indication output by the pre-decode stage 405, to allow for an early indication of an error condition. However, such comparison circuitry 375 is shown by dotted lines in FIG. 5, since its inclusion is not necessary, and even in the absence of such comparison circuitry, correct operation of the data processing apparatus is ensured. In particular, any errors in the prediction made by the shared branch predictor 370, whether due merely to an inaccurate prediction or due to an error in the actual operation of the shared branch predictor caused by a permanent or transient fault, will be detected at the branch check stage 325 of the processing circuitry 350 and the corresponding branch check stage 425 of the redundant copy 450.

As shown in FIG. 5, the fetch stage 300 will fetch instructions from cache and/or main memory. For ease of illustration, only a level 1 instruction cache 360 is shown. Each time the fetch stage 300 issues an instruction address, comparison circuitry 365 checks that address with the corresponding instruction address issued by the fetch stage 400 of the redundant copy 450, and signals an error condition if there is any discrepancy between the two values. Based on the instruction address provided by the fetch stage 300, instruction data is retrieved from the level 1 instruction cache RAMs 360 and output to both the fetch stage 300 and the corresponding redundant fetch stage 400. The instruction to be executed is extracted from this data by each fetch stage if there is a cache hit. If there is a cache miss, the fetch logic will then fetch the appropriate instruction data from a higher level (e.g. level 2) of the cache hierarchy or main memory via a separate but similar interface. In accordance with the above description it is assumed that the cache controller circuitry hence resides within the processing circuitry 350 and redundant copy 650, to allow fault protection to be achieved in respect of the operation of the cache controller.

A similar approach is taken in respect of data values accessed by the execute stage 315. In particular, read data addresses output by the execute stage 315 cause data to be returned from the level 1 data cache RAM 380 to both the execute stage 315 and the corresponding redundant execute stage 415 in the event of a cache hit. However, for write data addresses, only the execute stage 315 provides write data to the level 1 data cache RAM 380. The data may be accessed directly in the level 1 data cache in the event of a level 1 cache hit, but if there is a level 1 cache miss, the execute logic will then access the appropriate data in a higher level (e.g. level 2) of the cache hierarchy or main memory via a separate but similar interface. Comparison circuitry 385 is provided for comparing the data address output by the execute stage 315 with the corresponding data address output by the execute stage 415, and for signalling an error condition in the event of any discrepancy between those two values.

Both the level 1 instruction cache 360 and the level 1 data cache 380 may ensure the correctness of the data stored therein via standard ECC techniques. Accordingly, it is only the shared branch predictor 370 which has no fault protection. However, for the reasons discussed in detail earlier, the operation of the shared branch predictor 370 is inherently safe, and accordingly significant size and power consumption benefits can be realised by sharing the branch predictor 370 rather than replicating it separately within the processing circuitry 350 and the redundant copy 450.

Figure 6:
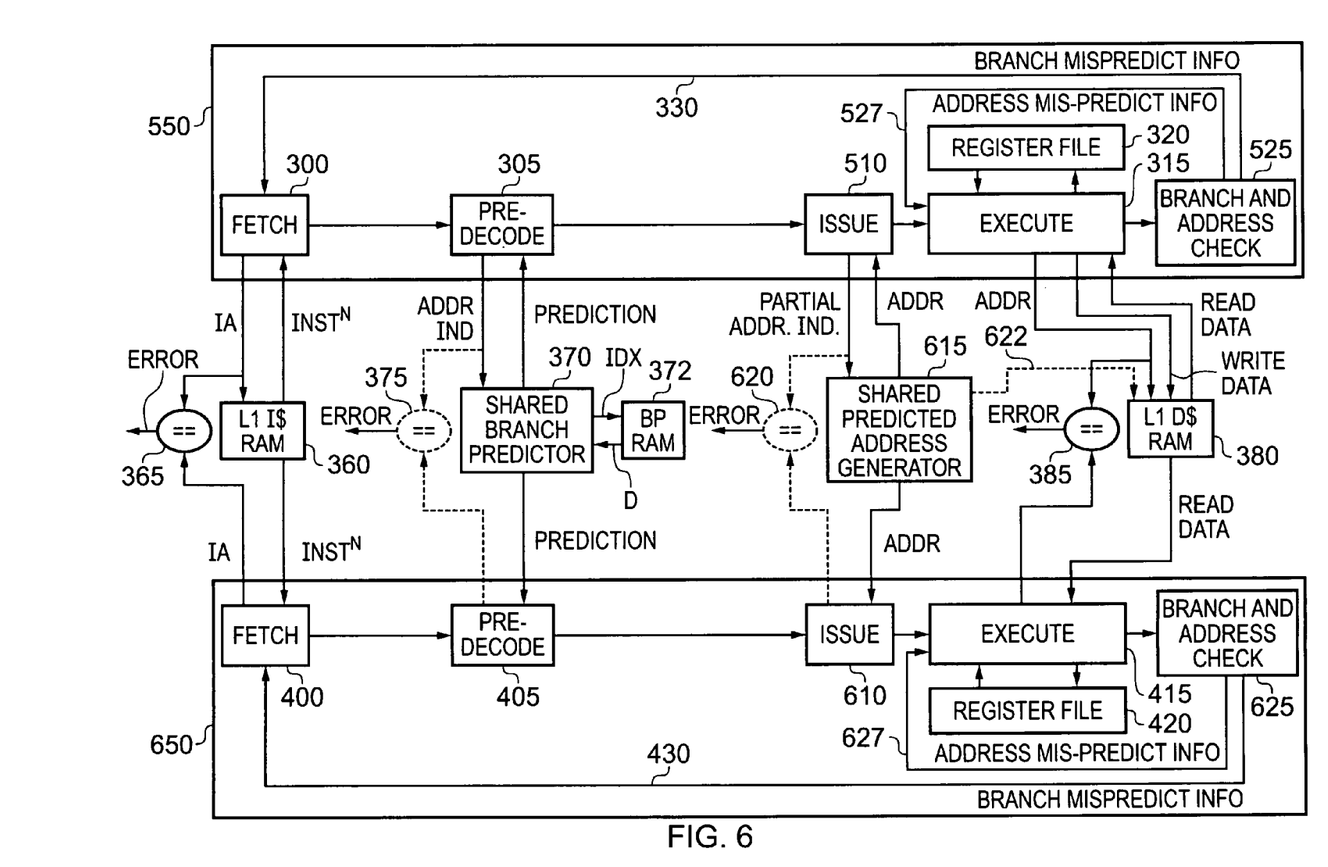
FIG. 6 is a block diagram of a data processing apparatus in accordance with an alternative embodiment.

FIG. 6 shows a data processing apparatus in accordance with an alternative embodiment of the present invention. Elements in FIG. 6 shown with the same reference numerals as the corresponding elements in FIG. 5 operate as described with reference to FIG. 5, and accordingly will not be discussed further herein. As shown in FIG. 6, in addition to a shared branch predictor 370, there is also a shared predicted address generator 615. The issue stage 510 of the processing circuit 550 performs basically the same operation as the issue stage 310 of the processing circuitry 350 of FIG. 5. However, in addition, the issue stage 510 determines a partial address indication and outputs it to the shared predicted address generator 615.

Typically there is not enough time within the issue stage to fully decode the address of the one or more data values required as source operands for a data processing operation to be performed in the execute stage 315. However, there may be enough time to generate a partial address indication which is sufficient to allow the shared predicted address generator 615 to predict the address to be accessed. This predicted address can then be returned from the shared predicted address generator 615 to both the issue stage 510 and to the corresponding issue stage 610 within the redundant copy 650. Subsequently that predicted address will be output from the execute stage to the level 1 data cache 380 which operates in exactly the same way as discussed earlier with reference to FIG. 5.

However, at the end of the execute stage, the branch and address check stage 525 will check not only any predicted next instruction indication provided by the shared branch predictor 370, but also any predicted data address provided by the shared predicted address generator 615. In the event of a data address misprediction, address misprediction information can be returned to the execute stage 315 over path 527 to cause the correct data to be retrieved and the operation re-performed using the correct data. A corresponding address misprediction path 627 is provided within the redundant copy 650, which is used when the branch and address checking stage 625 determines that the predicted data address returned from the shared predicted address generator 615 was incorrect.

As with the shared branch predictor 370, the shared predicted address generator 615 may optionally have associated comparison circuitry 620 for comparing any partial address indication output by the issue stage 510 with the corresponding partial address indication output by the issue stage 610, with an error condition being generated in the presence of any discrepancy between those values.

In one embodiment, as shown by the dotted line 622 in FIG. 6, in addition to returning the predicted address information to the issue stage 510 and the corresponding issue stage 610, the shared predicted address generator 615 can directly initiate a lookup in the level one data cache RAM 380 via the path 622 if desired.

As with the shared branch predictor 370, the operation of the shared predicted address generator 615 is inherently safe, since any incorrect data address provided, whether due to an inaccurate prediction, or due to a permanent or transient fault within the shared predicted address generator, will later be detected by the branch and address check stage 525, 625, with the appropriate corrective action being taken.

The partial address indication can take a variety of forms. However, as one specific example, a full data address decode may involve determining not only an address value (by combining a base address with an offset), but also a physical storage structure (referred to herein as a "side") to access. For example, the processing circuitry 550 may have one or more tightly coupled memory (TCM) structures as well as the level 1 data cache 380 connected thereto. In one embodiment, the partial address indication may take the form of the base address, with the shared predicted address generator 615 then predicting the "side" information (also referred to as "chip select" information) from the base address alone. In the address check stage 525, 625, the actual determined "side" information generated during the execute stage 315 from the complete address value can be compared with the predicted "side" information produced by the shared predicted address generator 615.

From the above description of embodiments, it will be apparent that by sharing prediction circuitry, rather than replicating it within both the processing circuitry and the redundant copy, significant area and power consumption benefits can be achieved without affecting the ability of the apparatus to detect faults. Such techniques can hence reduce the area cost of implementing redundant-logic systems for safety-critical systems.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus, comprising:
    processing circuitry for performing a sequence of data processing operations;
    a redundant copy of said processing circuitry for operating in parallel with said processing circuitry to perform said sequence of data processing operations;
    error detection circuitry for detecting an error condition when output data generated by said processing circuitry differs from corresponding output data generated by said redundant copy; and
    shared prediction circuitry for generating predicted data input to both the processing circuitry and the redundant copy, the processing circuitry and redundant copy arranged to perform speculative processing of one or more of the data processing operations in said sequence in dependence on said predicted data;
    each of the processing circuitry and said redundant copy including checking circuitry for determining whether the speculative processing was correct, and initiating corrective action if the speculative processing was not correct, wherein said processing circuitry and said redundant copy are configured to generate computed data during performance of said sequence of data processing operations, and the checking circuitry is configured to compare the predicted data with corresponding computed data in order to determine whether the speculative processing was correct.

2. A data processing apparatus as claimed in claim 1, wherein said shared prediction circuitry comprises branch prediction circuitry and said predicted data generated by the shared prediction circuitry is input directly to both the processing circuitry and the redundant copy.

3. A data processing apparatus as claimed in claim 1, wherein the shared prediction circuitry is branch prediction circuitry for generating as said predicted data at least an indication of a next instruction to be executed following a branch instruction.

4. A data processing apparatus as claimed in claim 3, wherein said predicted data comprises at least one of:
an indication of whether a branch specified by the branch instruction is predicted to be taken or not taken;
an address of the next instruction;
the next instruction.

5. A data processing apparatus as claimed in claim 1, wherein said shared prediction circuitry is data access prediction circuitry for generating as said predicted data a data address indication for identifying data to be fetched into the processing circuitry and the redundant copy.

6. A data processing apparatus as claimed in claim 1, wherein the shared prediction circuitry is responsive to stimulus data from said processing circuitry to generate said predicted data in dependence on said stimulus data and to issue said predicted data to both the processing circuitry and the redundant copy.

7. A data processing apparatus as claimed in claim 6, wherein said error detection circuitry is further arranged to compare said stimulus data with corresponding stimulus data from said redundant copy, and to detect said error condition when said stimulus data and said corresponding stimulus data do not match.

8. A data processing apparatus as claimed in claim 1, wherein the processing circuitry and redundant copy perform said sequence of data processing operations at the same processing rate.

9. A data processing apparatus as claimed in claim 8, wherein the redundant copy performs said sequence of processing operations with a fixed timing offset relative to said processing circuitry.

10. A data processing apparatus as claimed in claim 1, wherein both the processing circuitry and the redundant copy comprise a plurality of pipeline stages, and the error detection circuitry is arranged to receive output data from at least one pipeline stage of the processing circuitry and corresponding output data from the corresponding at least one pipeline stage of the redundant copy.

11. A data processing apparatus as claimed in claim 10, wherein said error detection circuitry is arranged to receive output data from multiple pipeline stages of the processing circuitry and corresponding output data from the corresponding multiple pipeline stages of the redundant copy, so as to detect said error condition in any of at least the address values and data values output by the processing circuitry and the redundant copy.

12. A method of providing fault tolerance within a data processing apparatus comprising processing circuitry for performing a sequence of data processing operations, and a redundant copy of said processing circuitry for operating in parallel with said processing circuitry to perform said sequence of data processing operations, the method comprising the steps of:
employing shared prediction circuitry to generate predicted data input to both the processing circuitry and the redundant copy;
within each of the processing circuitry and the redundant copy, performing speculative processing of one or more of the data processing operations in said sequence in dependence on said predicted data;
within each of the processing circuitry and said redundant copy, performing one or more checking operations to determine whether the speculative processing was correct, and initiating corrective action if the speculative processing was not correct, wherein said processing circuitry and said redundant copy are configured to generate computed data during performance of said sequence of data processing operations, and the one or more checking operations compare the predicted data with corresponding computed data in order to determine whether the speculative processing was correct; and
detecting an error condition when output data generated by said processing circuitry differs from corresponding output data generated by said redundant copy.

13. A data processing apparatus, comprising:
processing means for performing a sequence of data processing operations;
redundant means for providing a redundant copy of said processing means for operating in parallel with said processing means to perform said sequence of data processing operations;
error detection means for detecting an error condition when output data generated by said processing means differs from corresponding output data generated by said redundant means; and
shared prediction means for generating predicted data input to both the processing means and the redundant means, the processing means and redundant means for performing speculative processing of one or more of the data processing operations in said sequence in dependence on said predicted data;
each of the processing means and said redundant means including checking means for determining whether the speculative processing was correct, and initiating corrective action if the speculative processing was not correct, wherein said processing means and said redundant means are configured to generate computed data during performance of said sequence of data processing operations, and the checking means compares the predicted data with corresponding computed data in order to determine whether the speculative processing was correct.

* * * * *